Patented May 9, 1939

2,158,019

UNITED STATES PATENT OFFICE 2,158,019

VULCANIZATION OF RUBBER

Albert M. Clifford, Stow, Ohio, assignor to Wingfoot Corporation, Wilmington, Del., a corporation of Delaware No Drawing. Application May 8, 1937,
Serial No. 141,559

17 Claims. (Cl. 18—53)

This invention relates to the vulcanization of rubber and particularly to the acceleration of this process.

Many compounds are known which are useful as accelerators of the vulcanization of rubber. The present invention embraces a new class of compounds, the members of which are very useful when employed as accelerators. The invention includes this new class of compounds, their use in rubber and the rubber products obtained thereby.

The compounds are obtained from the reaction of a mercapto aryl thiazole, preferably in the form of an alkali metal salt, and a halogen-substituted dioxane or sulfur analog thereof. The preferred compounds of the latter group are those which are obtained by the halogenation of the compounds represented by the following formulae.

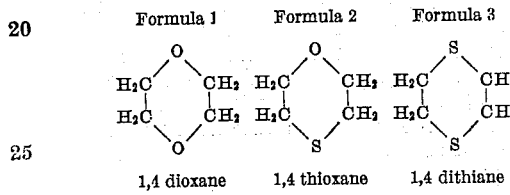

Formula 1  Formula 2  Formula 3

1,4 dioxane  1,4 thioxane  1,4 dithiane

These materials, on halogenation, readily produce 2,3 halo derivatives. For example, if 1,4 dioxane is chlorinated, it readily forms the dichlor compound represented by the following formula

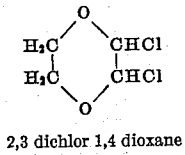

2,3 dichlor 1,4 dioxane

In the same manner, the corresponding chlorides and other halogen derivatives, such as the bromides, of the analogous compounds may be formed. While the derivatives of the materials represented by Formulas 1-3 are preferred and, of these, the dihalo derivatives are preferred, other related compounds may also be employed. For example, it is possible to form dicyclic derivatives similar to the monocyclic compounds. A chlorinated derivative of this type is represented by the following formula

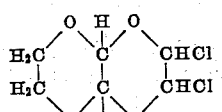

It is also possible to employ the analogs of the type exemplified by the following formula.

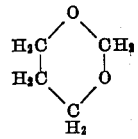

1,3 dioxane

Although both the mono and higher halo-substituted derivatives may be employed, the dihalo materials constitute the preferred group. The following chlor compounds are exemplary of the various halo compounds which may be employed: 2,3 dichlor 1,4 dioxane; 2 chlor 1,4 dioxane; 2 chlor 1,3 dioxane; 2,3 dichlor 1,4 thioxane; 2 chlor 1,4 dithiane; 2,3 dichlor 1,4 dithiane.

These materials are reacted with a mercaptoarylthiazole which is preferably in the form of an alkali metal salt. The following examples will demonstrate the preparation of typical compounds.

Three hundred grams of 1,4 dioxane were placed in a flask which was fitted with a reflux condenser and immersed in a water bath. The temperature of this bath was maintained at 85-98° C. during a total of 22 hours while chlorine was passed into the dioxane. Hydrogen chloride was evolved, at first rapidly, then slowly, until at the end the evolution nearly ceased. The product in the flask was weighed from time to time and at the end of the run the increase in weight was 214 grams, which corresponded to 91.2% of the theoretical quantity necessary for the production of a dichlor derivative. The product was subjected to distillation under reduced pressure to yield the following fractions, some hydrogen chloride coming out in the first fraction.

Fraction 1, boiling point to 80°, pressure 6 mm., weight 9.0 grams
Fraction 2, boiling point 80-110° C., pressure 6 mm., weight 456.0 grams The residue weighed 36.5 grams. Fraction 2 was predominantly 2,3 dichlor 1,4 dioxane and constituted a yield which was 85.5% of the theoretical.

*Example 1.—The bis thio benzothiazole derivative*

A mixture of 59.5 grams of the sodium salt of 2-mercaptobenzothiazole and 24.5 grams of 2,3 dichlorodioxane (prepared by the above procedure) in 300 cc. of toluene was refluxed 8 hours. The reaction mixture was cooled and the insoluble material filtered off. After drying, the residue was extracted with water, by which process 0.288 mol of NaCl was removed, and again with boiling 2% sodium hydroxide, the latter treatment removing 10.5 grams of unreacted mercaptobenzothiazole. The material not dissolving in the sodium hydroxide and amounting to 16 grams possessed a melting point of 208.5–209° C. and was found to be substantially free from chlorine.

Analysis

| | Calculated for $C_{13}H_{14}N_2S_4O_2$ | Found |
|---|---|---|
| | Percent | Percent |
| Nitrogen | 6.7 | 7.51–7.58 |
| Sulfur | 30.58 | 29.45–29.47 |

The compound found is believed to be

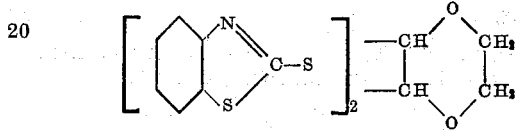

*Example 2.—The mono benzothiazyl derivative*

A mixture of 52.5 grams of mercaptobenzothiazole (0.315 mol) and 24.5 grams of 2:3 dichlorodioxane (0.154 mol) was refluxed in 300 cc. of toluene until the evolution of HCl ceased. The solution was cooled and allowed to stand for a while, then the amber colored liquid was decanted from the crystalline mercaptobenzothiazole which, washed free of impurities, amounted to 23.0 grams. The toluene was evaporated from the solution at 6–8 mm. pressure by heating on a steam bath. A brown, non-crystallizable, oily residue weighing 44.5 grams was obtained. This product contained considerable combined chlorine, and apparently consisted of a mixture of the product described in Example 1 with mono benzothiazyl sulphide, the latter being expressed, perhaps, by the formula:

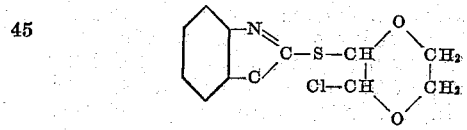

Other mercapto aryl thiazoles may be substituted for the mercaptobenzothiazole of these examples. Exemplary of the group are: 2-mercaptobenzothiazole, 2-mercapto 6-nitrobenzothiazole, 6-chlor 2-mercapto benzothiazole, 2-mercapto 4-phenyl benzothiazole, 2-mercapto 4-methyl benzothiazole, 6-ethoxy 2-mercapto benzothiazole, 2-mercapto 6-methoxy benzothiazole, 6-chlor 2-mercapto 5-nitro benzothiazole, 6-hydroxy 2-mercapto benzothiazole, the 2-mercapto alpha and beta napthothiazoles, and other alkyl-, aryl-, nitro-, amino-, hydroxy-, halo-, and alkoxy-substituted 2-mercapto arylene thiazoles of the benzene and naphthalene series.

As indicated by the structural formulas shown in Examples 1 and 2, it is believed that the chlorine atoms on the ring are replaced by aryl thiazyl mercapto groups corresponding to the mercaptoaryl thiazole employed. However, it is intended that the invention shall cover the materials prepared by the procedure outlined, or equivalent procedure, whatever may be their structure.

The materials of the invention may be employed in various compounding formulae used in the vulcanization of rubber. The following is one formula in which they have been found to yield excellent results.

| | Parts by weight |
|---|---|
| Smoked sheet | 100.00 |
| Zinc oxide | 5.0 |
| Sulfur | 3.0 |
| D. P. G. succinate | 0.20 |
| Titanium oxide | 10.0 |
| Accelerator. | |

The product of Example 2 was incorporated into rubber in accordance with this formula. Samples were cured and tested to yield the following results.

| Cure in mins. | Tensile kgs/cm.² | Elongation maximum | Modulus | |
|---|---|---|---|---|
| | | | 500% | 700% |
| 20/260 | 50 | 960 | 8 | 16 |
| 30 | 85 | 910 | 12 | 29 |
| 40 | 118 | 880 | 16 | 47 |
| 60 | 130 | 830 | 22 | 67 |
| 80 | 143 | 815 | 24 | 76 |

It will be seen from these data that excellent cures are imparted to the rubber by these accelerators. As demonstrated in the above example, good tensile strength may be obtained without danger of scorching. The accelerators may be utilized by themselves but because of their rather slow curing properties it is preferred to employ them with an activator such as the diphenyl guanidine succinate used in the specific formula noted. Other auxiliary accelerators, preferably basic nitrogen-containing accelerators, may also be employed. Examples are diphenyl guanidine, di tolyl guanidine, etc. and various salts thereof.

While only the preferred forms of the invention have been disclosed in detail, it will be apparent to those skilled in the art that various modifications may be made therein without departing from the spirit of the invention or the scope of the appended claims in which it is intended to claim all of patentable novelty residing in the invention.

I claim:

1. The method of treating rubber which comprises vulcanizing it in the presence of an arylenethiazyl-2-thio derivative of a compound selected from the group consisting of the dioxanes and their sulfur analogs.

2. The method of treating rubber which comprises vulcanizing it in the presence of an arylenethiazyl-2-thio dioxane.

3. The method of treating rubber which comprises vulcanizing it in the presence of a mono benzothiazyl-2-thio dioxane.

4. The method of treating rubber which comprises vulcanizing it in the presence of a di(benzothiazyl-2-thio) dioxane.

5. The method of treating rubber which comprises vulcanizing it in the presence of 2,3 di-(benzothiazyl-2-thio) 1,4 dioxane.

6. The method of treating rubber which comprises vulcanizing it in the presence of a mixture of benzothiazyl-2-thio dioxanes.

7. A rubber product which has been vulcanized in the presence of an arylenethiazyl-2-thio derivative of a compound selected from the group consisting of the dioxanes and their sulfur analogs.

8. A rubber product which has been vulcanized in the presence of an arylenethiazyl-2-thio dioxane.

9. A rubber product which has been vulcanized in the presence of a mono benzothiazyl-2-thio dioxane.

10. A rubber product which has been vulcanized in the presence of a di(benzothiazyl-2-thio) dioxane.

11. A rubber product which has been vulcanized in the presence of 2,3 di(benzothiazyl-2-thio) 1,4 dioxane.

12. A rubber product which has been vulcanized in the presence of a mixture of benzothiazyl-2-thio dioxanes.

13. As a new compound, an arylenethiazyl-2-thio derivative of a compound selected from the group consisting of the dioxanes and their sulfur analogs.

14. As a new compound, an arylenethiazyl-2-thio dioxane.

15. As a new compound, a mono benzothiazyl-2-thio dioxane.

16. As a new compound, a di(benzothiazyl-2-thio) dioxane.

17. As a new compound, 2,3, di(benzothiazyl-2-thio) 1,4 dioxane.

ALBERT M. CLIFFORD.